United States Patent
Neumann et al.

(10) Patent No.: US 6,753,970 B1
(45) Date of Patent: Jun. 22, 2004

(54) TRANSDUCER FOR GENERATING OPTICAL CONTRASTS

(75) Inventors: Burkhard Neumann, Iserlohn (DE); Christof Krampe, Bochum (DE)

(73) Assignee: Leica Microsystems Wetzlar GmbH, Wetzlar (DE)

( * ) Notice: Subject to any disclaimer, the term of this patent is extended or adjusted under 35 U.S.C. 154(b) by 0 days.

(21) Appl. No.: 09/575,532

(22) Filed: May 22, 2000

(30) Foreign Application Priority Data

May 21, 1999 (DE) .......................................... 199 23 295

(51) Int. Cl.⁷ .............................................. G01B 11/30
(52) U.S. Cl. ..................................... 356/600; 356/614
(58) Field of Search ................................ 356/600, 614

(56) References Cited

U.S. PATENT DOCUMENTS

| | | | |
|---|---|---|---|
| 5,004,307 A | 4/1991 | Kino et al. ................... 350/1.2 |
| 5,121,256 A | 6/1992 | Corle et al. .................. 359/664 |
| 5,349,443 A | 9/1994 | Guerra ........................ 356/376 |
| 5,859,727 A | * 1/1999 | Tsuchiya ..................... 359/387 |
| 6,023,378 A | * 2/2000 | Schaenzer ................... 359/819 |
| 6,407,884 B1 | * 6/2002 | Osborne et al. ............ 360/114 |

* cited by examiner

*Primary Examiner*—Richard A. Rosenberger
(74) *Attorney, Agent, or Firm*—Foley & Lardner LLP (57) ABSTRACT

A transducer in an imaging optical system for generating optical contrasts in the near-field representation of topographies of an object by outcoupling evanescent waves from the underside of the transducer. The transducer comprises a substrate having a transparent plane-parallel protuberance corresponding to the field size of the imaging optical system and pointing toward the object. The specimen outcouples evanescent waves from an underside of the transducer, where the transducer underside is arranged in a focal plane of the imaging optical system.

36 Claims, 10 Drawing Sheets

TRANSDUCER FOR GENERATING OPTICAL CONTRASTS

BACKGROUND OF THE INVENTION

1. Field of the Invention

The invention relates to a transducer for generating optical contrasts in the near-field representation of topographies of an object by outcoupling evanescent waves from the underside of a transducer, the transducer underside being arranged in the focal plane of an imaging optical system assigned to the transducer.

2. Related Art

It is known from U.S. Pat. No. 5,349,443 that a plane-parallel glass plate (transducer) in the immediate vicinity of a specimen surface can be used to generate a tunnel contrast. For this purpose, the transducer is illuminated obliquely and in the process the critical angle of total reflection between glass and air is exceeded. As a result, surface waves, known as evanescent waves, occur at the transducer underside. Illumination and observation of the transducer underside are performed with the aid of an immersion objective of high numerical aperture. Object points which dip into the propagation region of the evanescent waves outcouple the light at these points. On the transducer underside, the topography of the object stands out as spatial intensity modulation of the light.

Since the field strength of the evanescent wave field decays exponentially with distance from the transducer underside and is already still only I/e of the original, $$\text{after } \delta = \frac{\lambda_o}{2\pi\sqrt{NA - 1}}$$

where $\lambda_0$=vacuum wavelength; and

NA=numerical aperture of the objective, the sample surface to be imaged must be brought up to the transducer as far as a fraction of a micrometer. This condition creates problems in several regards.

In addition to the fine surface topography relevant to imaging, inside the object field to be observed the object generally has a surface curvature which can be observed at a relatively large scale. It is thereby frequently difficult, if not impossible, to approach sufficiently close to the points to be observed. Even approaching an ideally flat specimen is very difficult, if not impossible, whenever there is a particle of dirt on it. Moreover, adjusting the flat transducer underside to be sufficiently parallel to the specimen surface is attended by a high outlay.

U.S. Pat. No. 5,349,443, mentioned above, discloses using a flexible transducer. The transducer is to be stiff and flat enough inside the object field, but is to be able to yield to the unevennesses in the specimen surface over relatively large distances. This flexible transducer is intended to be able to compensate even for dirt particles.

Such a flexible transducer constitutes an improvement over a rigid large-area glass plate. However, it must be accepted that the transducer touches the specimen surface locally in order to be able to adapt itself to the specimen surface over a large area. For the purpose of investigating sensitive specimens such as, for example, integrated circuits, this is not at all acceptable, however, because touching the specimen generally entails destroying it. Moreover, a higher degree of transducer flexibility is traded off against a reduction in the hardness of the transducer material, with the result that the underside can easily be scratched and therefore becomes unusable for outcoupling evanescent rays.

Instead of an immersion object with a transducer, U.S. Pat. No. 5 5,004,307 discloses using a dry objective, in which a vitreous spherical segment is arranged in the space between the objective and object. This segment is denoted as a "Solid Immersion Lens (SIL)". This SIL is such that the side facing the object has a flat face. The light incident from the dry objective is totally reflected at this face, which also represents the focal plane of the objective, with the result that tunnel contrast can arise. An advantage of this arrangement resides in that it is generally possible to approach the specimen because of the special shape of the SIL. The disadvantages of this device reside, however, in the very expensive production of the SIL, in the very high outlay on adjustment, in the production of an extremely flat plane surface through polishing with a very slight surface roughness, in the imaging errors caused by the SIL in conjunction with higher numerical apertures and, finally, also in the high outlay in exchanging the SIL if the lower plane surface should be damaged by touching the specimen.

In the near-field operating mode, both the evanescent wave field immediately outside the SIL plane surface and the light wave field propagating in air are used to image an object which is arranged in the vicinity of the SIL. The light wave field can be used for focussing, and the evanescent wave field enhances the resolution in air by a factor of 1/n, n being the refractive index of the material from which the SIL is produced. Consequently, it is possible, at least partially, to avoid diffraction effects which limit the resolution for imaging in-air in standard microscopy by means of the near-field operating mode.

U.S. Pat.No. 5,121,256 also discloses using this effect to produce topographies on an object surface. There is a permanent need in optical lithography to transfer increasingly smaller pattern structures from a photomask onto a photoresist.

SUMMARY OF THE INVENTION

In view of the foregoing, it is an object of the invention to provide a transducer for producing optical contrasts in the near-field region of the transducer, with the aid of which it is possible freely to approach the specimen without making contact, which can be easily exchanged, which can be adapted to specific specimen geometries, which can be displaced perpendicular to the optical axis of the imaging optical system, and whose production costs are favorable.

In accomplishing some or all of the preceding objects, there has been provided according to the present invention a transducer in an imaging optical system for generating optical contrasts in the near-field representation of topographies of an object by outcoupling evanescent waves from the underside of the transducer. The transducer comprises a substrate having a transparent plane-parallel protuberance corresponding to the field size of the imaging optical system and pointing toward the object. The transducer outcouples evanescent waves from an underside of the transducer, where the transducer underside is arranged in a focal plane of the imaging optical system.

One of the advantages achieved with the transducer according to certain embodiments of the invention is that, with the protuberance of the flat plate in the middle of the object field, it is necessary to bring only a small area of the plate underside close to the surface of the specimen. Thus, unevenness over large areas of the specimen, or even dirt particles outside the protuberance, do not prevent the approach. This form of the transducer also permits the imaging optical system and the transducer to be joined as a mechanical unit, and renders it possible for the objects to be investigated to be moved under this unit.

Further objects, features and advantages of the invention will become apparent from the detailed description of the preferred embodiments of the invention that follows, when considered together with the accompanying drawings, which are in part schematic.

DETAILED DESCRIPTION OF THE PREFERRED EMBODIMENTS

Figure 1:
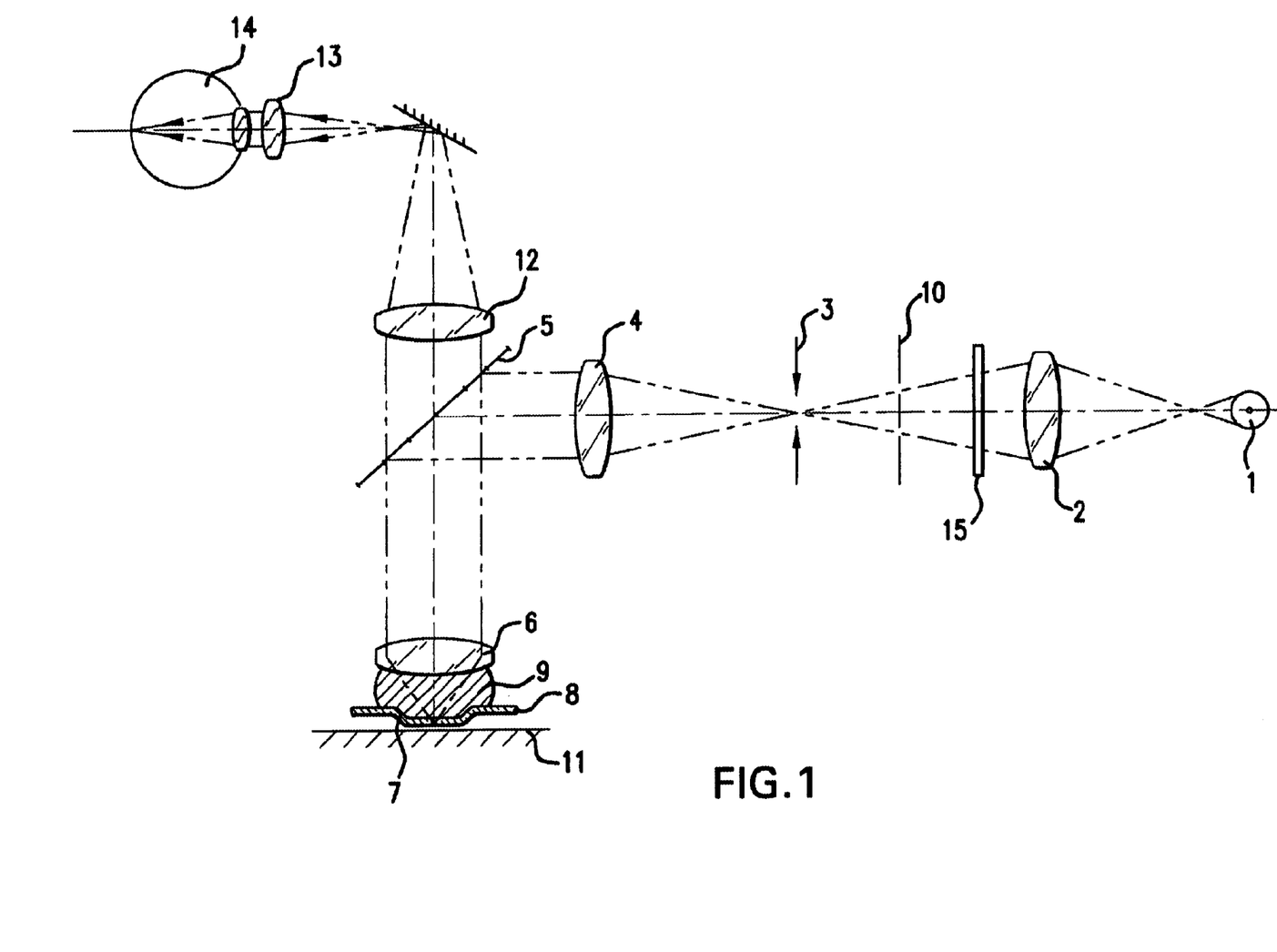
FIG. 1 shows an embodiment of the present invention, the beam path of a reflected light microscope with a transducer.

FIG. 1 shows the beam path, known per se, of a reflected light microscope with image formation in the bright field. A light source 1, such as a laser, lamp, or the like, is imaged into the plane of a field stop 3 via a condenser 2. A downstream collimator lens 4 images the opening of the field stop 3 to infinity. Via a partially transmitting beam splitter 5, the illuminating beam path is directed onto an objective 6 which images the field stop 3 onto the front side of the protuberance 7 of a transducer 8. An immersion 9 for adapting the refractive index is inserted between the objective 6 and the transducer 8.

According to this embodiment, an annular aperture stop 10 is arranged upstream of the field stop 3 in the beam path of the illuminating optical system 1, 2. This aperture stop produces an annular illuminating beam which, after imaging by the objective 6, falls onto the exit surface of the transducer 8 at an extremely oblique angle. The result of this is to excite on the face of the protuberance 7 facing an object 11 an evanescent wave that is localized at the underside of the protuberance 7, without being emitted into the lower half space. Structures of the object 11 which project into this wave field outcouple light which passes only partially into the microscope again for imaging purposes. Since a portion of the scattered light is lacking at these image locations, they appear darker than their surroundings. After passing through the beam splitter 5, the light backscattered into the objective 6 by the transducer 8 is fed to the visual observation 14 via a tube lens 12 and an eyepiece 13.

In order to improve the contrast between illuminating and observing beams, a polarizer 15 can further be inserted into the illuminating beam path, it being possible for the reflection of the beam splitter 5 additionally to be adapted to the polarization produced. The polarization is varied by the interaction of the illuminating beams with the transducer 8 and the topography of the object 11, and, in this case, the imaging beams changed in the polarization are passed through the beam splitter 5.

The transducer according to this embodiment of the present invention is preferably used in combination with an objective of a reflected light microscope, the aim being to fit the latter with a dark field beam path, in order to be able to separate the illuminating beams from the imaging beams via stop arrangements. The near-field representation of the topographies can comprise both the imaging of existing topographies and the production of topographies. In another embodiment of the present invention, the objective of an information write and/or read unit is provided as the imaging optical system, and the object is an optical memory.

Figure 2:
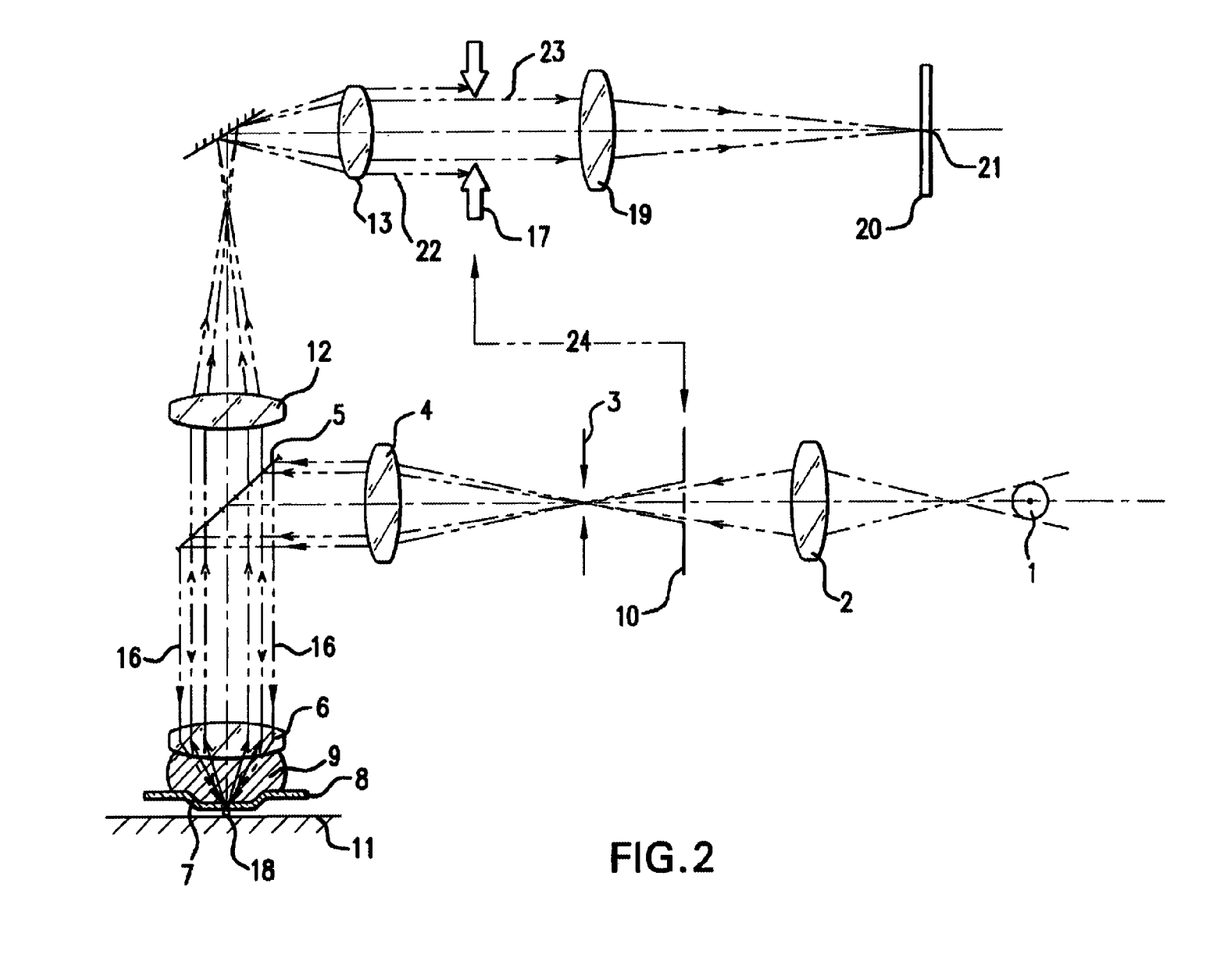
FIG. 2 shows an embodiment of the present invention, the beam path of a reflected light microscope with a dark field arrangement.

An extension of this imaging embodiment is illustrated in FIG. 2. In this illustration, the outer edge beams 16 of the annular illuminating beam are drawn in as a supplement. After reflection at the protuberance 7 of the transducer 8, the edge beams uninfluenced by the object 11 are masked out of the observing beam path by a dark field stop 17, which is arranged precisely in the exit pupil plane of the microscope. Only the scattering object structures 18 are imaged, owing to this measure. The remainder of the illuminated object field remains dark in the image.

A lens 19 of a relatively long focal length images the object 11 onto an image sensor 20 at high magnification. The scattering object structure 18 is thus detected by the image sensor 20 as image point 21. The undiffracted beams 22 are masked out by the dark field stop 17, whereas all the beams 23 belonging to the scattered light pass unhindered to the image sensor 20.

The annular aperture stop 10 and the dark field stop 17 must have their dimensions coordinated exactly with one another. For this reason, when changing the aperture stop, a positive coupling 24 should exist for the changer for the dark field stops.

Figure 3:
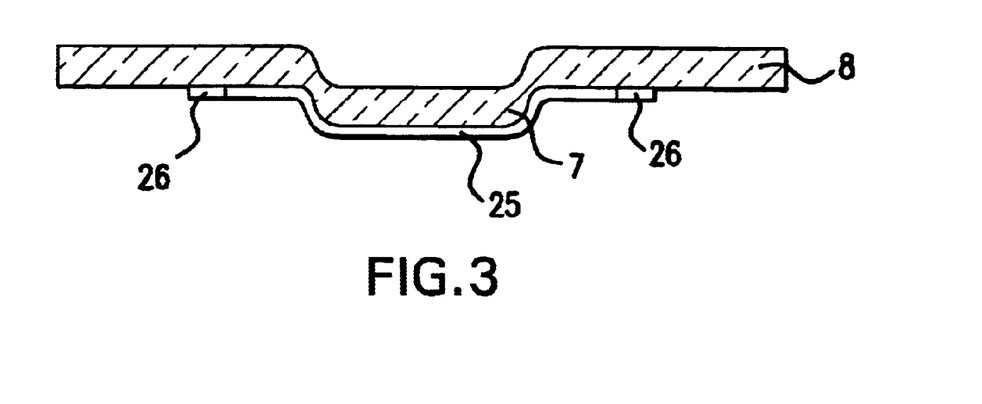
FIG. 3 shows a section through a transducer.

FIG. 3 shows a sectional illustration of a transducer 8 with a protuberance 7. The protuberance can be of particularly deep and narrow configuration for particularly problematical specimen topographies with large height differences, with the result that then, as well, it is still possible to approach the specimen without local impediments.

According to this embodiment of the present invention, the face of the protuberance facing the object can be modified in multiple ways with structures and/or coatings by which the functions of the transducer are supplemented, modified and/or rendered more reliable. Circular marks facilitate the alignment of the protuberance relative to the optical axis of the imaging optical system and to the focal plane of the imaging optical system. Refractive and diffractive structures permit the illuminating beams to be coupled into the transducer in a particular way. Layers which produce electric capacitors, or particular stop arrangements can be used as proximity sensors. Coatings and layers having a material which is harder or refracts the light more strongly can protect the transducer underside and can enhance the resolution.

For example, as was described in the background section, application errors can cause contact with the specimen. In this embodiment, a thin layer or coating 25 made from a very hard, transparent material prevents the formation of scratches and thus damage to the transducer. A further and very important reason for using a coating with a material which additionally also has a high refractive index, is that the evanescent wave (surface wave) has a wavelength which is inversely proportional to the refractive index of the transducer underside (i.e., the high-index layer in the case of the coating). Since, in some cases, high-index, transparent materials can be processed just as well as glass, it is nevertheless possible to shape the transducer ideally in conjunction with this thin-film technique. Suitable materials will be apparent to those of skill in the art given the present description.

Light couplers 26 are also illustrated in FIG. 3 at the edge of the layer 25. Preferably, these are arranged concentrically about the midpoint of the protuberance 7 and are located at the edge of the object field to be observed. The light couplers 26 preferably comprise refractive and/or diffractive elements as are known from integrated optics. In this embodiment, the light is coupled into the high-index layer 25, which acts as a film waveguide, radially in relation to the middle of the protuberance 7. The light falling into the coupler usually comes at different angles from the objective.

The transducer is preferably used in an immersion arrangement for the purpose of adapting the refractive index between the transducer and imaging optical system. For example, the intermediate space is filled with an immersion, such as a suitable oil. In addition to a liquid immersion, it is also advantageously possible to use elastic or plastic substances.

Figure 4:
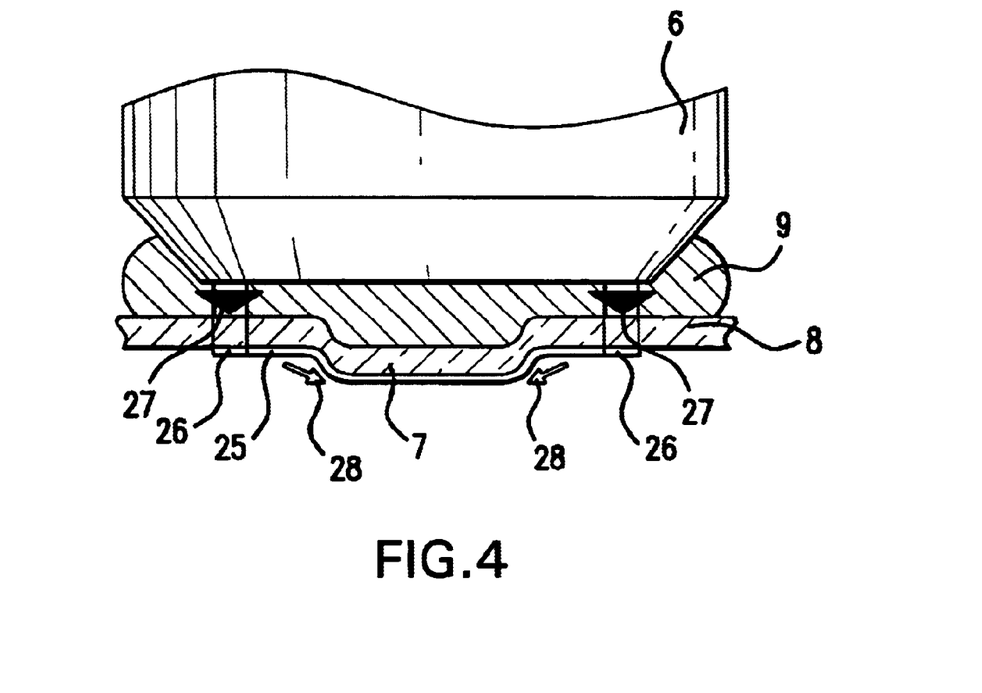
FIG. 4 shows a sectional illustration of the transducer according to FIG. 3 in combination with the imaging optical system.

This embodiment is further illustrated in FIG. 4. The objective 6 and the transducer 8 are coupled to one another optically via the immersion 9. Depending on the circumstances, it can be suitable in this case to select the immersion 9 as a transparent plastic or elastic substance, so that the immersion cannot flow out into the immersion objective when the transducer is permanently installed. Immersions are known which are liquid for the time of the transducer installation and the alignment with the objective, and then become plastic or elastic by virtue of a conversion process induced optically, chemically or in some other way. Also, the transducer and/or the objective can be separated again from the immersion in the case of exchange. The immersion medium should be such that no internal stresses can form, for example, in order to avoid stress birefringence.

The outside of the high-index layer 25 is situated as exactly as possible in the focal plane of the objective 6. The annular illumination is illustrated schematically by a light beam 27, which is provided with a directional arrow, and falls onto the light coupler 26 through the transducer 8. The propagation of light in the direction of the arrow 28 in the high-index layer 25 acting as a film waveguide causes a portion of the wave field in the region of the protuberance 7 to project into the object space. However, because of total reflection, it is initially not emitted into the object space.

Figure 5:
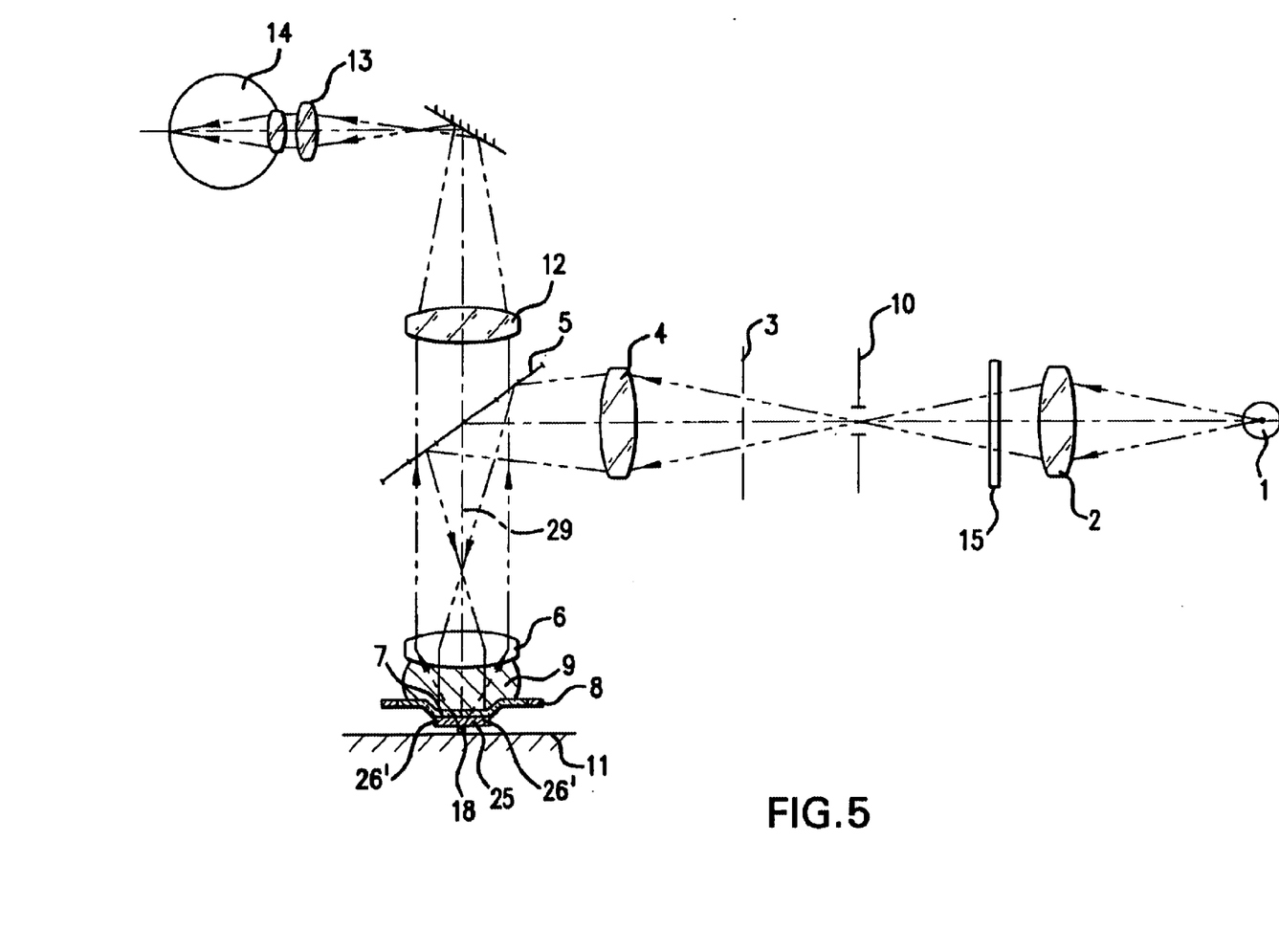
FIG. 5 shows an embodiment of the present invention, the beam path of a reflected light microscope with diffractive coupling of the illuminating beams into the transducer.

In the exemplary embodiment illustrated in FIG. 5, a diffraction grating structure 26' arranged on the protuberance 7 concentrically with the optical axis 29 of the imaging optical system is provided as a light coupler for the high-index layer 25. As already mentioned, the wavelength of the evanescent wave decreases with increasing refractive index n of the transducer material. Because of the known dependence between the numerical aperture "NA" of an immersion objective and the refractive index n, where, NA=n·sin (u), the wavelength $\lambda_{ev}$ of the evanescent wave is inversely proportional to NA.

According to the law of refraction, the numerical aperture NA remains constant, however. Coupling of the light wave into the high-index layer 25, which coupling is caused by refraction of light, therefore does not lead immediately to a desired shorter wavelength $\lambda_{ev}$. However, the concentric grating structure 26' arranged in the edge region of the protuberance 7 diffracts the incident light wave in such a way that it propagates in the high-index layer 25 in a fashion as parallel to the surface thereof as possible. It then holds in this case that NA=n and $$\lambda_{ev} = \frac{\lambda_o}{n}$$

(where, $\lambda_0$ is the vacuum wavelength). In order to achieve this effect, the grating constant g of the grating structure 26' must correspond to the wavelength $\lambda$ in the transducer, because then the angle of diffraction is $\partial=90°$. The production of structures diffracting in such a way can be carried out by electron beam lithography, as would be understood by one of skill in the art given the present description.

An illuminating device for light coupling, according to this embodiment, is likewise illustrated in FIG. 5. The aperture stop 10 is constructed here as a circular bright field stop. By contrast, the illuminated field stop 3 contains openings precisely at the points which are imaged onto the diffracting structures 26' on the transducer. In this arrangement, the light is deflected into the objective 6 with the aid of the beam splitter 5. The objective 6 images the openings of the illuminated field stop 3 onto the diffracting structures 26' of the transducer 8, with the result that a layer wave forms in the high-index, transparent layer 25. The layer wave has an evanescent wave which reaches into the object space below the transducer. A scattering object structure 18 scatters the wave, and a portion of the scattered light passes via the transducer 8 back into the microscope again. Here, this object structure 18 passes via the tube lens 12 and the eyepiece 13 in the visual observation 14 for imaging.

Figure 6:
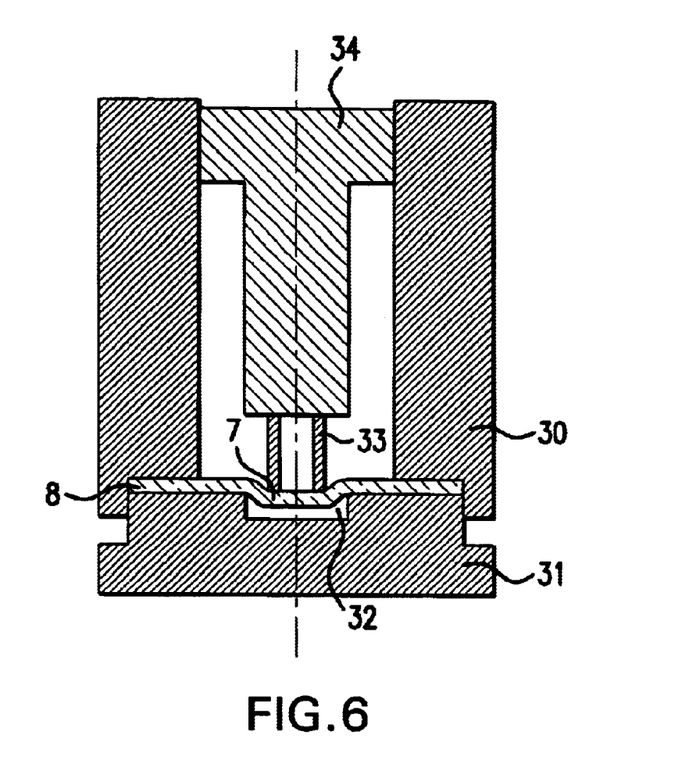
FIG. 6 shows an embodiment of the present invention, an embossing tool for producing the transducer.

FIG. 6 shows an embossing device for providing the transducer 8 with the protuberance 7 using a thermal embossing technique. For example, a thermal embossing method is very particularly suitable for producing the protuberance. The shape of the protuberance can be prescribed with the aid of the tip of the embossing punch, and the depth can be set via the material, length and process temperature of the embossing tool as would be understood by a person of ordinary skill in the art given the present description.

Provided in this embodiment as a transducer is a substrate, for example, a small commercially available square cover glass such as is used in microscopy for covering a specimen on a slide. This small cover glass is held between an upper part 30 and a lower part 31 of an embossing device. At the point at which embossing is to be performed, the lower part has a recess 32 which is of suitable depth such that the sensitive transducer surface does not come into contact with the surface of the lower part 31. The transducer surface should be as substantially flat as possible, particularly on the underside of the protuberance 7, because otherwise, the unevennesses would be superimposed on the actual image as an additional, interfering image information.

A small cover glass of this type is suitable to meet these requirements adequately. Different coefficients of expansion of various metals are utilized for embossing the protuberance. The upper part 30 can comprise, for example, brass, while the impressing punch 34 bearing the punch tip 33 can comprise aluminum. The upper end of the impressing punch 34 is joined to the upper part 30 of the embossing device. A tubelet can be made from high-grade steel and is effective as punch tip 33.

The difference between the coefficients of expansion of brass, aluminum and high grade steel corresponds to the length of the impressing punch 34, and the tip 33 corresponds to the effective penetration depth of the impressing punch into the small cover glass upon traversal of a specific temperature interval. In the case of a maximum punch length of 38 millimeters (mm) overall, it is possible to produce an impressing depth of 90 micrometers ($\mu$m) into the small cover glass which comprises, for example, BK 7 glass. The heating-up temperature is approximately 430° C., an optimum heating-up rate being approximately 8–10° C./min. The impressing rate is approximately 6 $\mu$m/min in this case.

The use of a tubelet as punch tip 33 is advantageous because, on the one hand, it gives rise to minimum contact surfaces with the small cover glass, which contact surfaces could damage the glass surface, and, on the other hand, the protuberance spans the tubelet in a manner resembling a diaphragm. Preferably, the flatness and parallelism of the glass platelets in the region of the protuberance are maintained optimally. Suitable protuberances have a diameter of approximately 1 mm. By arranging a plurality of punch tips 33 next to one another with different diameters, it is also possible to produce transducers with appropriate protuberance arrays.

Figure 7:
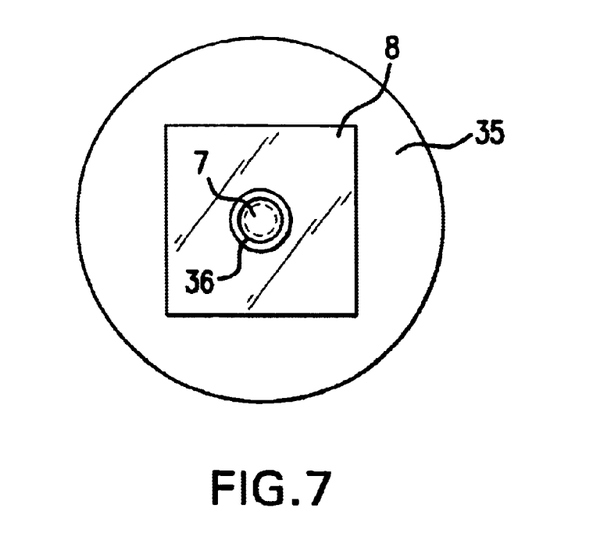
FIG. 7 shows a plan view of the transducer of the invention.

FIG. 7 shows a plan view of a transducer 8 with a protuberance 7. As a thin glass plate, the transducer 7 is very fragile and should not be fastened as an exchangeable part directly on the assigned objective. In this embodiment, the transducer is therefore inserted into a thin framed plate 35 which comprises, for example, steel, and is thereby lent its mechanical stability. The framed plate 35 can, for example, be fastened via magnets on the assigned objective.

According to yet another embodiment, the protuberance additionally has an annular marking 36 which is placed concentrically with the midpoint thereof. This marking can, for example, include a closed circle and a dashed circle, and serves the purpose of adjusting and centering the protuberance in the optical beam path of the microscope.

Figure 8:
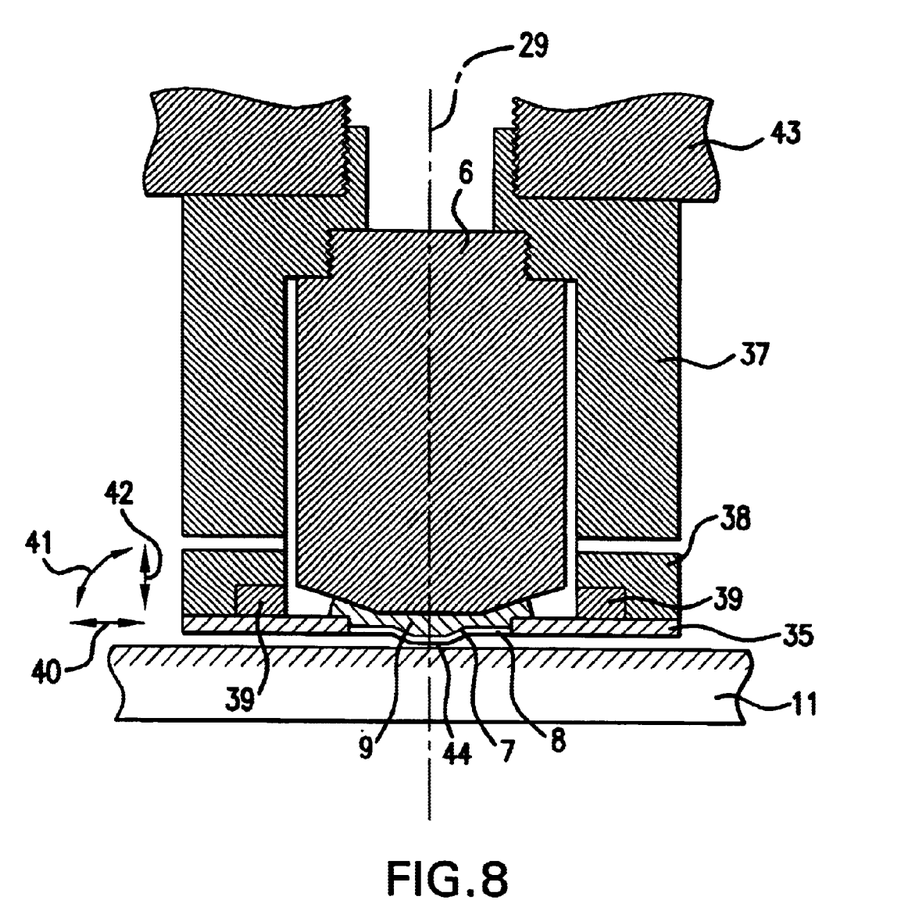
FIG. 8 shows an embodiment of the present invention, a sectional illustration for holding the transducer on an objective.

FIG. 8 shows a schematic of a holder for the framed plate 35 with the transducer 8 on an objective 6. The holder here comprises two parts 37 and 38, of which the part 37 is screwed into a microscope revolving nosepiece 43 and bears the objective 6. The part 38 is provided with magnets 39 and otherwise provided with a mechanical adjustment 40, 41, 42 in all degrees of freedom, which are indicated by arrows. The framed plate 35 is held exchangeably on the holding part 38 via the magnets 39. The adjustment of the protuberance relative to the focal plane of the objective 6 and centrally relative to the optical axis of the objective is performed, for example, by visual observation of the marking 36. For this purpose, the marking 36 is preferably placed on the face of the transducer facing the object 11.

In this example, the protuberance also has a partially transparent coating 44 in its edge region. One portion of the illuminating light is reflected at this layer; another portion is transmitted. The transmitted light passes onto the surface of the specimen 11, is reflected thereat, and interferes with the light waves reflected at the transparent layer. This interference phenomena can be detected with the aid of a suitable sensor and used to bring the specimen close to the transducer in a controlled fashion as would be apparent to one of skill in the art given the present description.

The protuberance on the transducer according to the invention permits a flat surface to be brought very close to a specimen surface. This renders it possible to superimpose artificial structures directly on the object, something which is otherwise possible only from the far-field by means of reduced projection. However, because of the limitation of resolution, it is not possible for arbitrarily fine structures to be superimposed on the object via the far-field. A grating, for example, is a structure which is advantageous for enhancing contrast. A grating projection with over-resolution occurs in the near-field region. The light reflected by the object can pass into the objective through the corresponding grating gap. Because of the diffraction, the fine structure is no longer imaged onto object regions further removed from the grating, and the transmission of light back to the objective is reduced. This produces a very sensitive topography contrast in the near grating region. In the same way as the annular grating structure 26' already mentioned, and the marking 36, such fine grating structures can be placed on the protuberance 7 of the transducer 8 by, for example, electron beam lithographic methods, as would be apparent to one of skill in the art given the present description.

Figure 9:
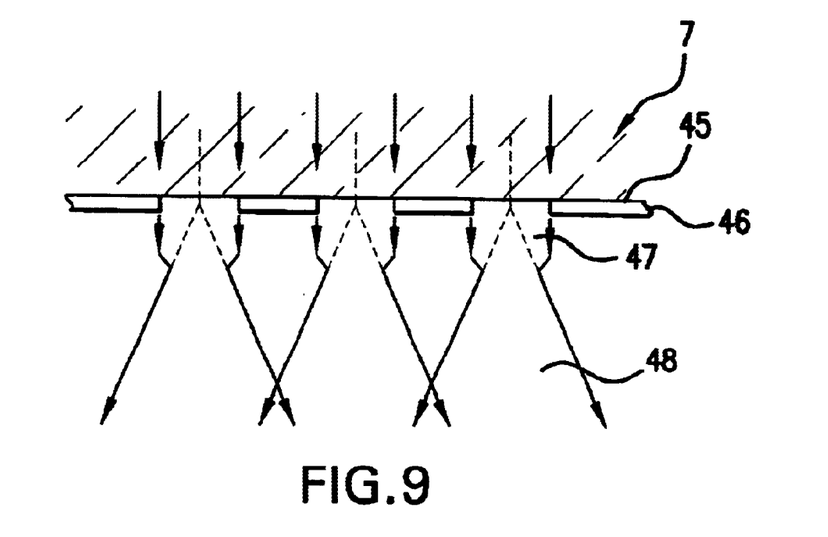
FIG. 9 shows a schematic of the principle of the wave fields, using a fine grating structure, on the transducer underside.

FIG. 9 illustrates the protuberance 7 having a fine grating structure 46 placed on the face 45 facing the object, with the near-field light beams 47 and far-field light beams 48 downstream of the grating. It is to be seen that no diffraction effects occur in the near-field region.

Figure 10:
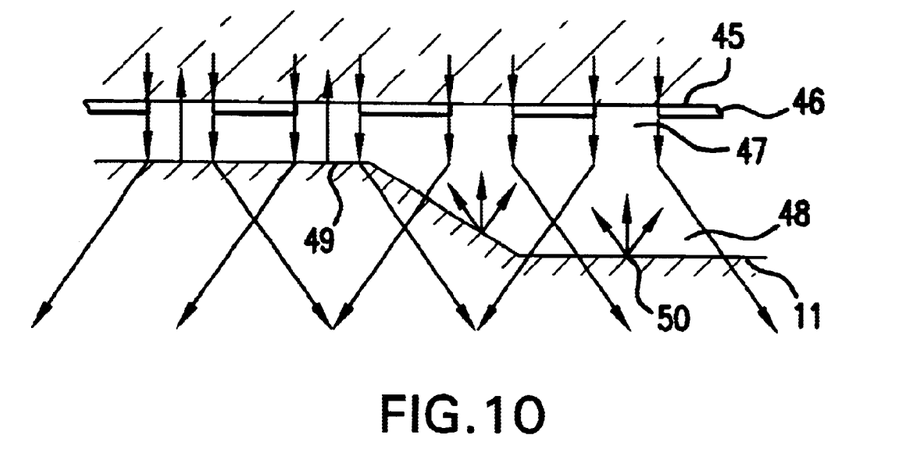
FIG. 10 shows a schematic of the principle of the wave fields in interaction with an object topography.

The contrast enhancement produced by grating projection on the topography of the surface of the object 11 is illustrated in FIG. 10. The surface in the near-field 47 is located in the object region 49, and the reflected light can pass back into the objective more effectively through the grating gap than in the object region 50, where the surface is already located in the far-field 48. Here, the diffraction prevents efficient transmission back through the grating.

Figure 11:
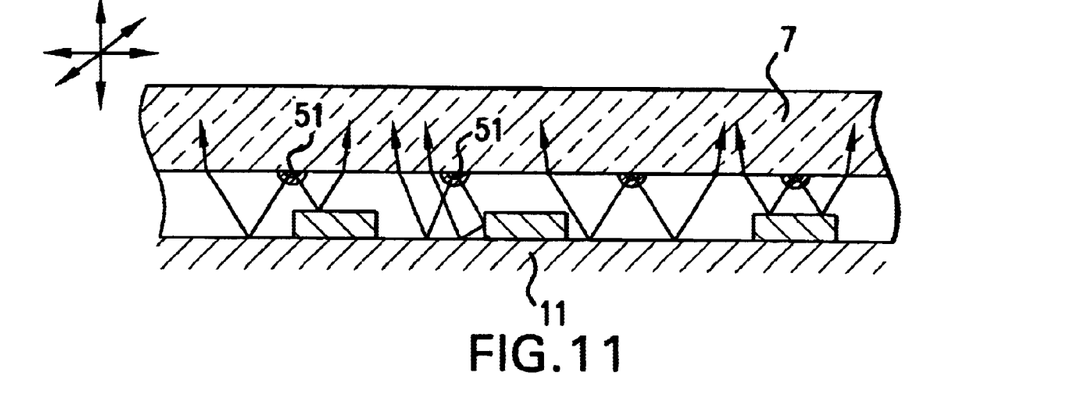
FIG. 11 shows an embodiment of the present invention, a transducer with active or passive light sources.
Figure 12:
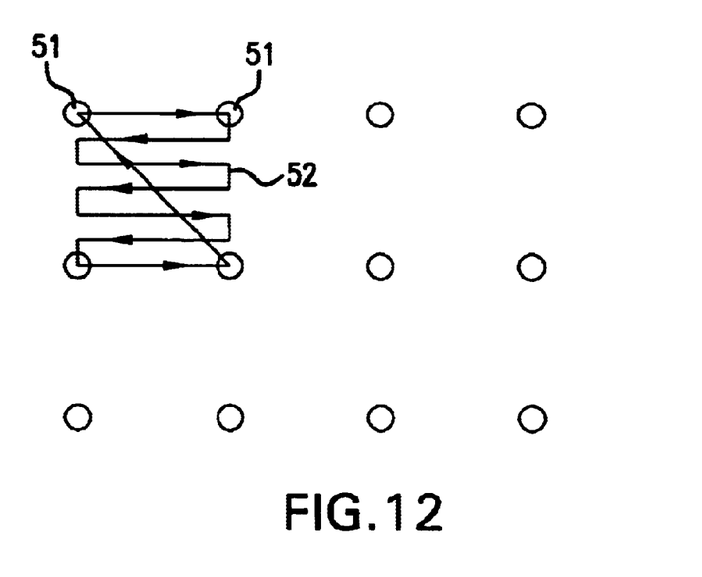
FIG. 12 shows a plan view of the grid-shaped arrangement of the light sources.

Scientific research has disclosed so-called quantum point lasers which have dimensions in the 30 nanometer (nm) region. According to another embodiment of the present invention, these small active light sources can be placed on the face 45 of the protuberance 7 facing the object. These light sources can then be used to scan an object with over-resolution. For example, FIG. 11 shows a regular arrangement of the quantum point lasers 51, which form a two-dimensional grating in plan view (FIG. 12). The object 11 can be scanned by a microscan 52 of the object 11, or of the transducer with protuberance 7. The illustration in FIG. 11 shows the differently reflected light beams for illumination and reflection at projecting object topographies. In order to be able to achieve scanning with over-resolution, the distance between adjacent quantum point lasers 51 must be greater than the resolution of the microscope in far-field operation.

Alternatively, instead of the quantum point laser which operates as an active light source, it is also possible to place a dot structure, arranged in the same way, made of a fluorescing material or metal, on the side of the protuberance facing the object. The dots are to have a lateral dimension which is below the resolving power of the microscope. The dots act as indirect point radiators, because both the fluorescent light and the scattered light produced on the metal faces must be produced by a primary light source.

Point-shaped light sources can likewise be produced by stop openings which are arranged in the form of a grating and are backlit. The object information is transmitted out of the near-field by the transmitted light.

Figure 13:
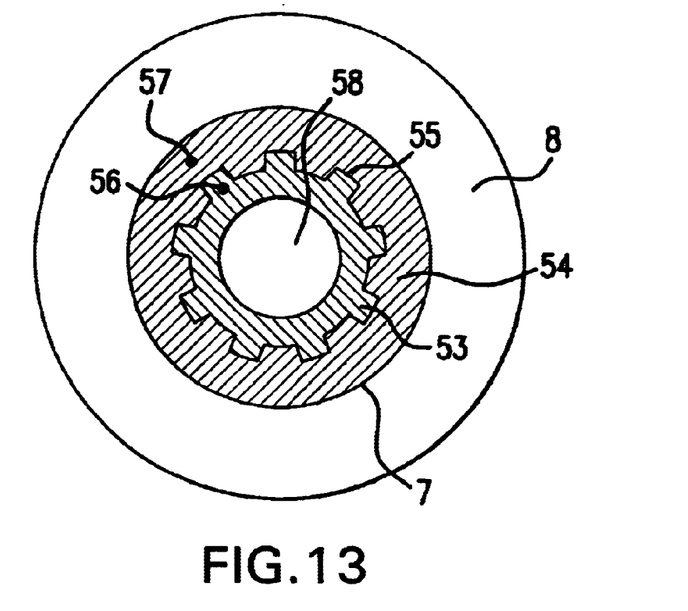
FIG. 13 shows an embodiment of the present invention, a plan view of a transducer with capacitor plates.

A signal dependent on the distance between the specimen and transducer is required to bring the specimen close to the transducer in a controlled fashion. Such signals can be produced by placing a capacitor structure on the top side or underside of the protuberance of the transducer. A suitable capacitor structure 53, 54 is illustrated in FIG. 13 and is placed in the edge region of the protuberance 7. The boundary line 55 between the electrically conducting layers 53, 54 is highly insulating. The layers 53, 54 are provided with electric contacts 56, 57. As the protuberance 7 is approached, the specimen passes into the electric stray field of the capacitor and thereby changes its capacitance. A corresponding signal can be tapped via the contacts 56, 57. The specific shape of boundary line 55 increases the magnitude of the electric stray field and amplifies the effect of the change in capacitance upon approach of the specimen. The central region 58 of the protuberance 7 serves for observing the specimen.

Figure 14:
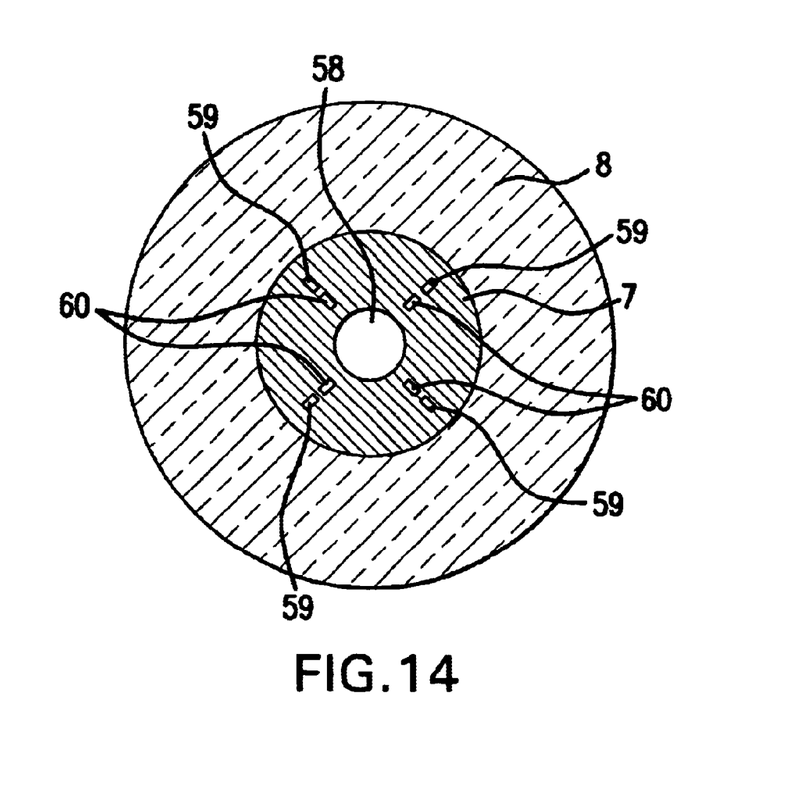
FIG. 14 shows an embodiment of the present invention, a plan view of a transducer with light entry and exit windows.
Figure 15:
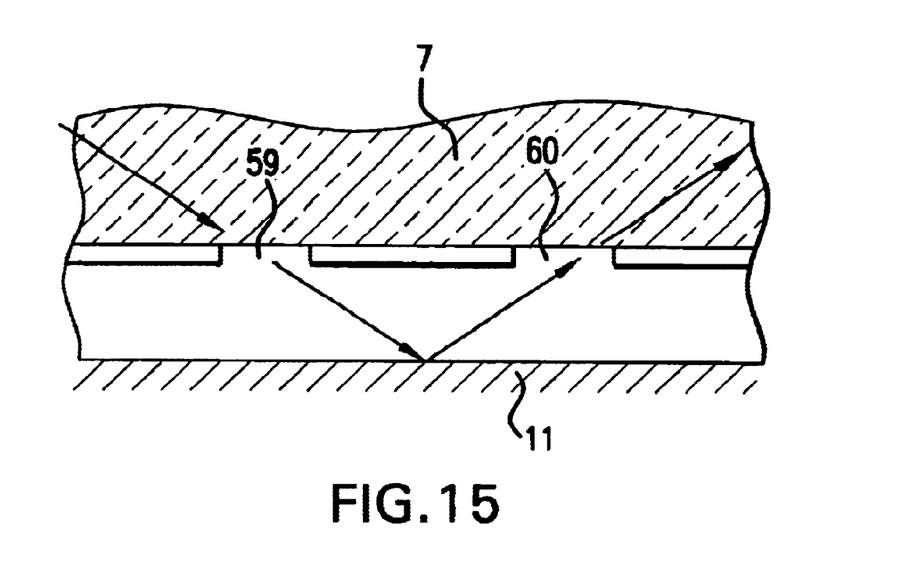
FIG. 15 shows a sectional illustration of the beam path through the windows according to FIG. 14 with an object in the near-field.
Figure 16:
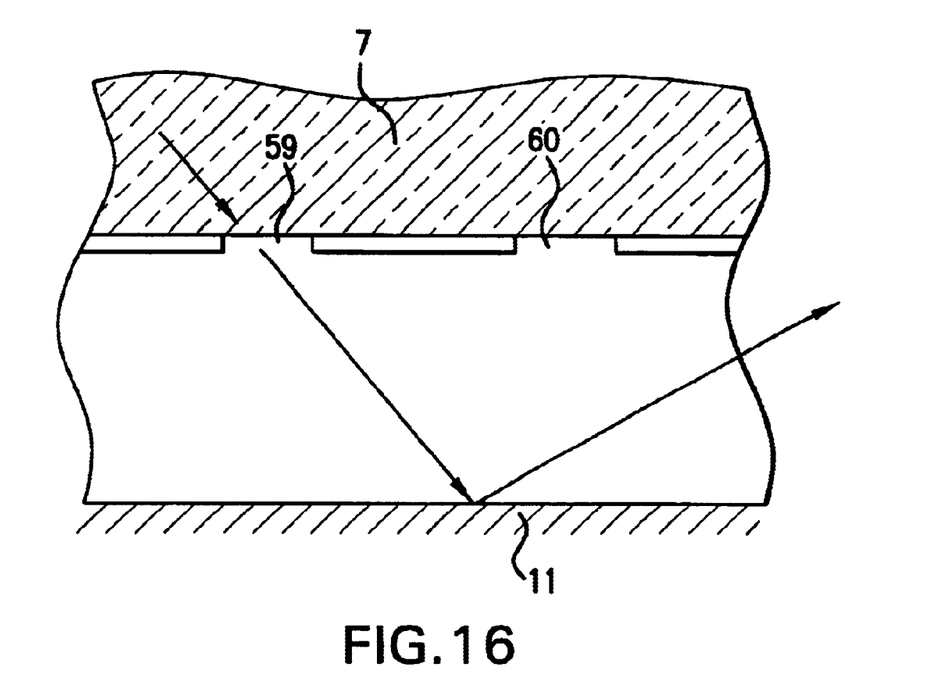
FIG. 16 shows a sectional illustration as in FIG. 15, with an object in the far field.

The stop arrangement, illustrated in FIG. 14, on the underside of the protuberance 7 likewise serves for producing a signal which increases monotonically with the reduction in the distance between the transducer and specimen. By contrast with the change in capacitance, use is made here of optical signal production. The underside of the transducer with the protuberance 7 is covered with an opaque layer which has in the region of the protuberance 7 a central region 58 for the near-field contrast, and additionally has small windows 59, 60 arranged in pairs. The pairs of windows are preferably arranged in the radial direction and symmetrically relative to the central region 58. One of the windows is illuminated in each case. FIG. 15 and FIG. 16 show the course of the illuminating beams as the object 11 is approached.

An optimum approach to the object 11 is shown in FIG. 15. From the illuminated window 59, after reflection at the surface of the object 11 the light reaches the window 60 where it is detected and supplies a signal, dependent on the distance, at a specific interval.

In FIG. 16, the distance between the object surface and the protuberance is so large that the light does not pass into the window 60 after reflection at the object surface.

A targeted illumination of the windows is achieved with the aid of an illuminated field stop provided with suitable openings. The arrangement illustrated in FIG. 5 having appropriately adapted stop openings is suitable for the illumination.

Although the invention has been described above by reference to certain embodiments, the invention is not limited to the embodiments described above. Modifications and variations of the embodiments described above will occur to those skilled in the art, in light of the above teachings. The scope of the following claims is intended to cover these obvious modifications.

German Patent Application No. 199 23 295.4 filed May 21, 1999, including the specification, the drawings, the claims, and the abstract, upon which this application is based, is incorporated herein by reference in its entirety.

What is claimed is:

1. An imaging optical system for imaging an object, comprising:
    a transducer comprising a substrate, the substrate having a transparent plane-parallel protuberance corresponding to a field size of the imaging optical system and pointing toward the object,
    wherein the object outcouples evanescent waves from an underside of the transducer,
    wherein the transducer underside is arranged in a focal plane of the imaging optical system, and
    wherein the imaging optical system is configured to generate optical contrasts in the near-field representation of topographies of the object.

2. The imaging optical system as claimed in claim 1, wherein the imaging optical system comprises:
    an objective of a reflective light microscope.

3. The imaging optical system as claimed in claim 2, further comprising:
    a dark field beam path defined, in part, by a dark field stop arranged at an exit pupil plane of the imaging optical system.

4. The imaging optical system as claimed in claim 1, wherein the imaging optical system comprises an objective of an information write and/or read unit and wherein the object is an optical memory.

5. The imaging optical system as claimed in claim 1, wherein the transducer comprises a thin glass platelet substrate, and the protuberance is produced by thermal embossing.

6. The imaging optical system as claimed in claim 1, wherein a face of the protuberance includes a marking situated concentrically with its midpoint.

7. The imaging optical system as claimed in claim 6, wherein the marking is located on a face of the protuberance facing the object.

8. The imaging optical system as claimed in claim 1, wherein the transducer is optically coupled to an objective of the imaging optical system via an immersion.

9. The imaging optical system as claimed in claim 8, wherein the immersion comprises an oil.

10. The imaging optical system as claimed in claim 8, wherein the immersion comprises a material selected from the group consisting of a transparent elastic substance and a plastic substance.

11. The imaging optical system as claimed in claim 1, further comprising:
    a layer applied to a face of the protuberance facing the object, wherein said layer comprises a uniformly thick, flat layer made from a material which has a higher refractive index than a refractive index of the protuberance.

12. The imaging optical system as claimed in claim 11, further comprising refractive or diffractive structures on the face of the protuberance facing the object in an edge region, wherein parallel light beams coming from the imaging optical system can be coupled into the layer with the higher refractive index.

13. The imaging optical system as claimed in claim 1, further comprising:
    a layer applied to a face of the protuberance facing the object, wherein said layer comprises a material having a higher resistance to scratching than the protuberance.

14. The imaging optical system as claimed in claim 1, further comprising:
    a thin-framed plate for holding the transducer.

15. The imaging optical system as claimed in claim 14, wherein the thin-framed plate is connected to the imaging optical system via an adjustable holder.

16. The imaging optical system as claimed in claim 15, wherein the adjustable holder permits an alignment of the protuberance in the focal plane of the imaging optical system.

17. The imaging optical system as claimed in claim 1, further comprising:
a partially transparent coating applied to a face of the protuberance facing the object, wherein the transparent coating is disposed in an edge region of the protuberance.

18. The imaging optical system as claimed in claim 1, further comprising:
a linear grating structure disposed on a face of the protuberance facing the object.

19. The imaging optical system as claimed in claim 1, further comprising:
an array of active light sources disposed on a face of the protuberance facing the object.

20. The imaging optical system as claimed in claim 1, further comprising:
a dot structure arranged in grating-form disposed on a face of the protuberance facing the object, wherein dots forming the dot structure have lateral dimensions below a resolving power of the imaging optical system, and wherein the dots comprise a fluorescing material.

21. The imaging optical system as claimed in claim 1, further comprising:
a point stop structure arranged in the form of a grating disposed on a face of the protuberance facing the object, wherein stop holes comprising the point stop structure have lateral dimensions below the resolving power of the imaging optical system, and wherein the stop holes are arranged as light exit openings and light entry openings for a near-field representation of the topography of the object.

22. The imaging optical system as claimed in claim 1, further comprising:
electrically conducting layers structured by fine dividing lines to form electric capacitors from suitable contact between two respectively associated regions electrically insulated from one another that are disposed in an edge region on a face of the protuberance facing the object.

23. The imaging optical system as claimed in claim 1, further comprising:
electrically conducting layers structured by fine dividing lines to form electric capacitors from suitable contact between two respectively associated regions electrically insulated from one another that are disposed in an edge region on a face of the protuberance facing an objective of the optical imaging system.

24. The imaging optical system as claimed in claim 1, further comprising:
an opaque layer, applied in an edge region to a face of the protuberance facing the object, having a plurality of windows situated symmetrically relative to one another for light exit and light entry.

25. The imaging optical system as claimed in claim 1, further comprising:
an objective.

26. The imaging optical system of claim 25, further comprising:
a grating structure disposed on a face of the protuberance facing the object; and an illuminating beam defined by a light source and an illuminated field stop having a plurality of openings, wherein an arrangement of said plurality of openings correspond to and are imageable onto the grating structure.

27. The imaging optical system as claimed in claim 1, wherein the transducer is optically coupled to an objective of the imaging optical system via a flexible immersion.

28. The imaging optical system as claimed in claim 27, wherein the flexible immersion comprises an oil.

29. The imaging optical system as claimed in claim 27, wherein the flexible immersion comprises a material selected from the group consisting of a transparent elastic substance and a plastic substance.

30. The imaging optical system as in claim 1, wherein said protuberance is integrally formed with said substrate.

31. The imaging optical system as in claim 1, wherein the imaging optical system is configured to generate said optical contrasts by measuring spatial intensities of the evanescent waves outcoupled by the object.

32. The imaging optical system as in claim 31, wherein the imaging optical system is a microscope configured to image a specimen.

33. A transducer, in an imaging optical system, for generating optical contrasts in the near-field representation of topographies of an object, comprising:
a substrate having a transparent plane-parallel protuberance corresponding to a field size of the imaging optical system and pointing toward the object, wherein the transducer outcouples evanescent waves from an underside of the transducer, wherein the transducer underside is arranged in a focal plane of the imaging optical system, and wherein a face of the protuberance comprises at least one of a grating structure, an array of quantum point lasers, a dot structure arranged in grating-form, and a point stop structure arranged in the form of a grating.

34. A transducer, in an imaging optical system, for generating optical contrasts in the near-field representation of topographies of an object, comprising:
a substrate having a transparent plane-parallel protuberance corresponding to a field size of the imaging optical system and pointing toward the object, wherein the transducer outcouples evanescent waves from an underside of the transducer, wherein the transducer underside is arranged in a focal plane of the imaging optical system, and wherein a face of the protuberance further comprises a layer applied thereon, wherein said layer comprises one of a material having a higher refractive index than a refractive index of the protuberance and a material having a higher resistance to scratching than the protuberance.

35. A transducer, in an imaging optical system, for generating optical contrasts in the near-field representation of topographies of an object, comprising:
a substrate having a transparent plane-parallel protuberance corresponding to a field size of the imaging optical system and pointing toward the object, wherein the transducer outcouples evanescent waves from an underside of the transducer, and wherein the transducer underside is arranged in a focal plane of the imaging optical system; and
electrically conducting layers structured by fine dividing lines to form electric capacitors from contact between two respectively associated regions electrically insulated from one another that are disposed in an edge region on a face of the protuberance facing one of the object and an objective of the optical imaging system.

36. A transducer, in an imaging optical system, for generating optical contrasts in the near-field representation of topographies of an object, comprising:

a substrate having a transparent plane-parallel protuberance corresponding to a field size of the imaging optical system and pointing toward the object, wherein the transducer outcouples evanescent waves from an underside of the transducer, and wherein the transducer underside is arranged in a focal plane of the imaging optical system; and at least one of: a) a partially transparent coating applied to a face of the protuberance facing the object, wherein the transparent coating is disposed in an edge region of the protuberance; and b) an opaque layer, applied in an edge region to a face of the protuberance facing the object, having a plurality of windows situated symmetrically relative to one another for light exit and light entry.

* * * * *